US012593319B2

(12) United States Patent
Sharma et al.

(10) Patent No.: US 12,593,319 B2
(45) Date of Patent: Mar. 31, 2026

(54) BANDWIDTH PART (BWP) SWITCH REQUEST

(71) Applicant: QUALCOMM Incorporated, San Diego, CA (US)

(72) Inventors: Hemant Sharma, Hyderabad (IN); Deepak Dowlagar, Warangal (IN); Siddhesh Sandesh Bahadkar, Panvel (IN)

(73) Assignee: QUALCOMM Incorporated, San Diego, CA (US)

( * ) Notice: Subject to any disclaimer, the term of this patent is extended or adjusted under 35 U.S.C. 154(b) by 424 days.

(21) Appl. No.: 18/151,060

(22) Filed: Jan. 6, 2023

(65) Prior Publication Data

US 2024/0236960 A1     Jul. 11, 2024

(51) Int. Cl.
*H04W 72/0453*      (2023.01)
*H04L 5/00*      (2006.01)
*H04W 72/232*      (2023.01)

(52) U.S. Cl.
CPC ......... *H04W 72/0453* (2013.01); *H04L 5/001* (2013.01); *H04L 5/0098* (2013.01); *H04W 72/232* (2023.01)

(58) Field of Classification Search
CPC ...................... H04W 72/0453; H04W 72/232; H04L 5/001; H04L 5/0098
See application file for complete search history.

(56) References Cited

U.S. PATENT DOCUMENTS

2019/0166066 A1*     5/2019     Ang .................... H04L 5/0078
2019/0261405 A1*     8/2019     Ang .................. H04W 72/1263

FOREIGN PATENT DOCUMENTS

CN          113079576 B      8/2022
CN          111629442 B      9/2022
WO     WO-2022216695 A1     10/2022

OTHER PUBLICATIONS

English Translation of CN 113079576 A, 2021, Retrieved from PE2E Search on Mar. 25, 2025 (Year: 2021).*
International Search Report and Written Opinion—PCT/US2023/082500—ISA/EPO—Apr. 2, 2024.

* cited by examiner

*Primary Examiner* — Omar J Ghowrwal
(74) *Attorney, Agent, or Firm* — QUALCOMM Incorporated

(57)     ABSTRACT

This disclosure provides systems, methods, and devices for wireless communication that support a bandwidth part (BWP) switch request. In a first aspect, a method of wireless communication includes receiving downlink control information (DCI) that indicates a BWP switch request. The method also includes, prior to execution of a BWP switch based on the BWP request, determining whether a first value of a first field of the DCI is valid. Other aspects and features are also claimed and described.

30 Claims, 7 Drawing Sheets

BANDWIDTH PART (BWP) SWITCH REQUEST

TECHNICAL FIELD

Aspects of the present disclosure relate generally to wireless communication systems, and more particularly, to a bandwidth part (BWP) switch request. Some features may enable and provide improved communications, including reduced control overhead, reduced BWP switching, efficient resource utilization, improved network access, or a combination thereof.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

A UE may communicate with a base station using a bandwidth part (BWP), such as first BWP. Additionally, the UE may receive a BWP switch request from the base station for the UE to switch to a second BWP. Based on the BWP switch request, the UE may switch from the first BWP to the second BWP. After the switch from the first BWP to the second BWP, the UE may determine whether one or more parameters associated with the BWP switch request are valid. If the one or more parameters are invalid, the UE switches back to the first BWP. During the back and forth switching from the first BWP to the second BWP and back to the first BWP, the UE loses reception time and is unable to communicate (e.g., misses one or more grants)

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method for wireless communication is performed by a user equipment (UE). The method includes receiving downlink control information (DCI) that indicates a bandwidth part (BWP) switch request. The method also includes.

In an additional aspect of the disclosure, an apparatus includes at least one processor and a memory coupled to the at least one processor. The at least one processor is configured to receive DCI that indicates a BWP switch request. The at least one processor is further configured to determine, prior to execution of a BWP switch based on the BWP request, whether a first value of a first field of the DCI is valid.

In an additional aspect of the disclosure, an apparatus includes a communication interface configured to receive DCI that indicates a BWP switch request. The apparatus further includes at least one processor coupled to a memory storing processor-readable code, the at least one processor configured to execute the processor-readable code to cause the at least one processor to determine, prior to execution of a BWP switch based on the BWP request, whether a first value of a first field of the DCI is valid.

In an additional aspect of the disclosure, an apparatus includes means for receiving DCI that indicates a BWP switch request. The apparatus further includes means for determining, prior to execution of a BWP switch based on the BWP request, whether a first value of a first field of the DCI is valid.

In an additional aspect of the disclosure, a non-transitory computer-readable medium stores instructions that, when executed by a processor, cause the processor to perform operations. The operations include receiving DCI that indicates a BWP switch request. The operations further include, prior to execution of a BWP switch based on the BWP request, determining whether a first value of a first field of the DCI is valid.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
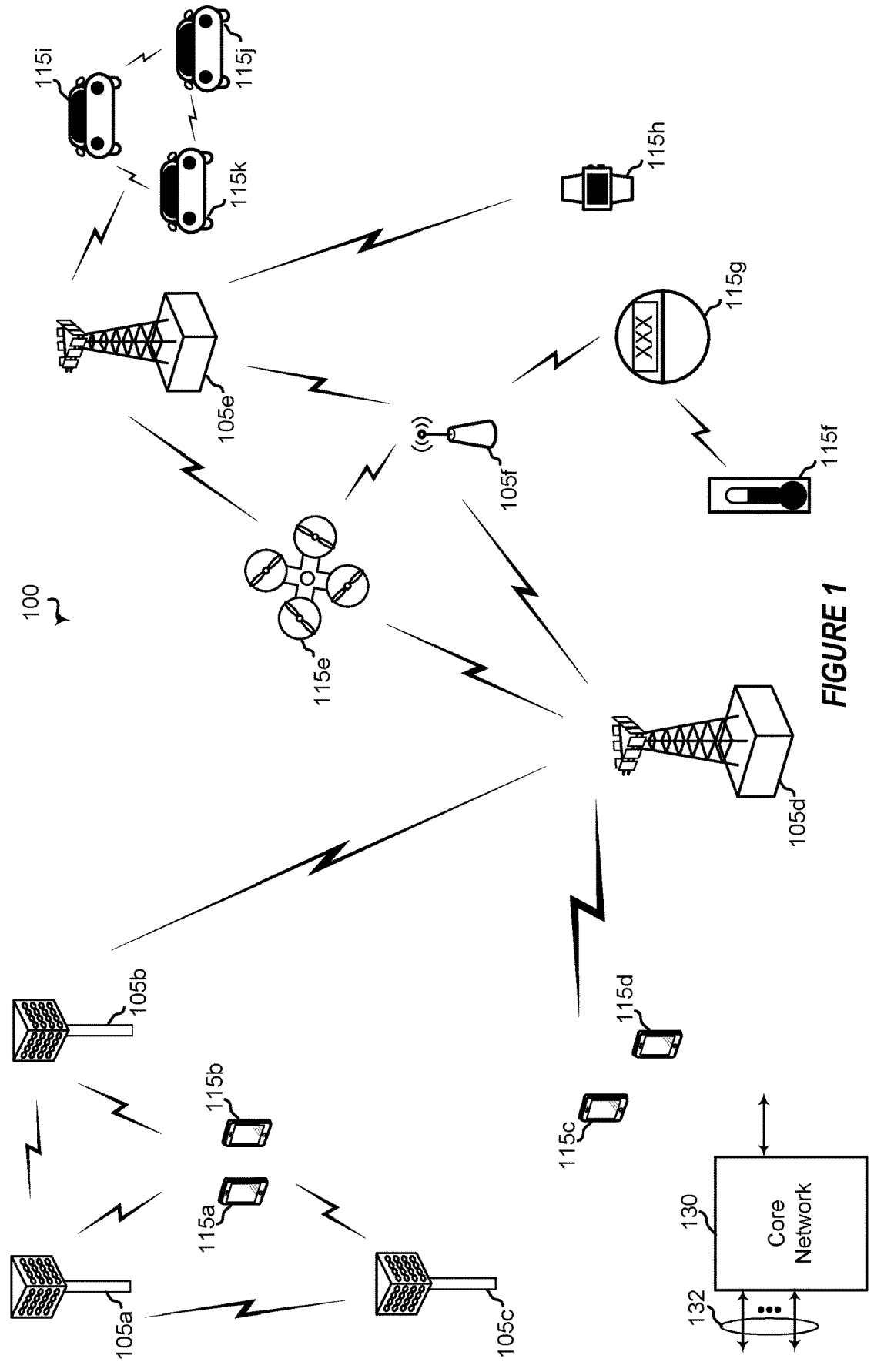
FIG. 1 is a block diagram illustrating details of an example wireless communication system according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support a bandwidth part (BWP) switch request. For example, the present disclosure describes a user equipment (UE) that is configured based on one or more first parameters that are common to one or more BWPs (e.g., a non-BWP specific parameter), such as a carrier indicator, a modulation and coding scheme, precoding information and a number of layers, a number of antenna ports, or a combination thereof. To illustrate, the one or more first parameters may be common to all BWPs while the UE is configured based on an RRC that includes or indicates the one or more first parameters. Additionally, or alternatively, the UE may be configured to use a first BWP one or more second parameters that correspond to the first BWP (e.g., a BWP specific parameter), such as a first frequency domain resource assignment field, a first time domain resource assignment field, or a combination thereof. UE 115 may receive downlink control information (DCI), such as an uplink (UL) DCI or a downlink (DL) DCI, from a base station. The DCI may include a first field, a second field, or a combination thereof. The first field may include or indicate one or more common parameters, such as one or more non-BWP specific parameters. The second field may include or indicate one or more parameters, such as one or more BWP specific parameters. Additionally, or alternatively, DCI may include a bandwidth part indicator. The bandwidth part indicator of the DCI may include or indicate a second BWP.

The UE may validate whether one or more fields of the DCI are valid. Based on a determination that a first value of the first field is invalid, the UE maintains the first BWP. Additionally, or alternatively, based on the determination that the first value of the first field is invalid, the UE generates error information that indicates the first field is invalid. Based on a determination that the first value of the first field is valid, the UE performs the BWP switch from the first BWP to a second BWP. After the BWP switch to the second BWP, the UE may determine whether a second value of the second field of the DCI is valid. In some implementations, the second field is a BWP specific field. The second field may include a frequency domain resource assignment field, a time domain resource assignment field, or a combination thereof. Based on a determination that the second value of the second field is invalid, the UE performs another BWP switch from the second BWP to the first BWP. Additionally, or alternatively, based on a determination that the second value of the second field is invalid, the UE may generate error information that indicates the second field is invalid. In some implementations, based on a determination that the second value of the second field is valid, the UE communicates using the second BWP. For example, the UE may communicate with the base station via the second BWP.

Particular implementations of the subject matter described in this disclosure may be implemented to realize one or more of the following potential advantages or benefits. In some aspects, the present disclosure provides techniques for supporting a BWP switch request. The techniques described may mitigate or prevent band and forth switching of BWPs based on the first value of the first field being invalid. In such circumstances (e.g., the first value of the first field being invalid), UE may avoid redundant switching during which UE would lose reception time or unable to communicate (e.g., misses one or more grants).

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5$^{th}$ Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspects. The wireless communication system may include wireless network 100. Wireless network 100 may for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD communications or low-latency FDD communications, such as in a vehicle-to-vehicle (V2V) mesh network between UEs 115i-115k communicating with macro base station 105e.

Base stations 105 may communicate with a core network 130 and with one another. For example, base stations 105 may interface with the core network 130 through backhaul links 132 (e.g., via an S1, N2, N3, or other interface). Base stations 105 may communicate with one another over backhaul links (e.g., via an X2, Xn, or other interface) either directly (e.g., directly between base stations 105) or indirectly (e.g., via core network 130).

Core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one packet data network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP multimedia subsystem (IMS), or a packet-switched (PS) streaming service.

In some implementations, core network 130 includes or is coupled to a Location Management Function (LMF) 131, which is an entity in the 5G Core Network (5GC) supporting various functionality, such as managing support for different location services for one or more UEs. For example the LMF 131 may include one or more servers, such as multiple distributed servers. Base stations 105 may forward location messages to the LMF 131 and may communicate with the LMF via a NR Positioning Protocol A (NRPPa). The LMF 131 is configured to control the positioning parameters for UEs 115 and the LMF 131 can provide information to the base stations 105 and UE 115 so that action can be taken at UE 115. In some implementations, UE 115 and base station 105 are configured to communicate with the LMF 131 via an Access and Mobility Management Function (AMF).

Figure 2:
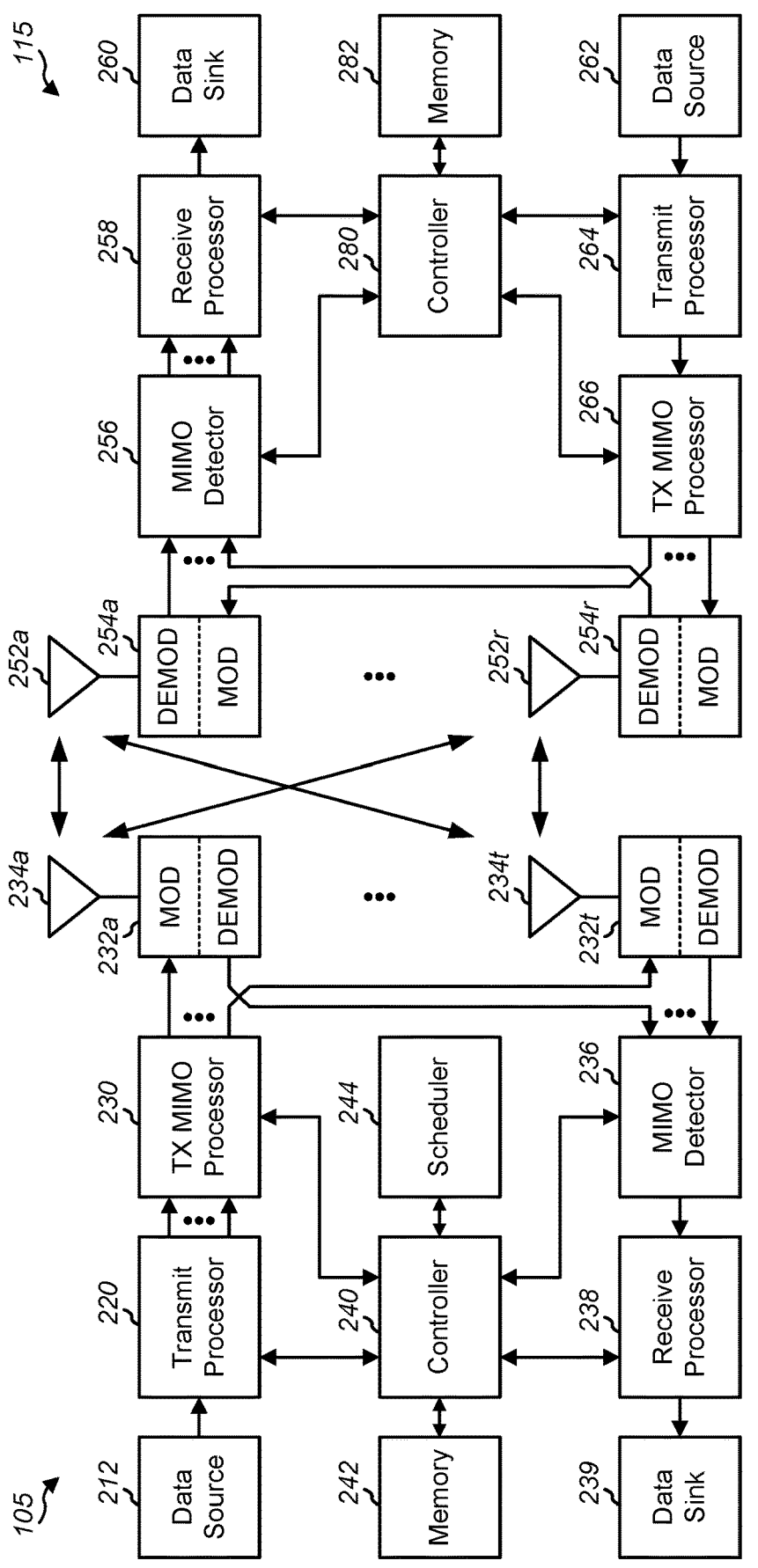
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105f in FIG. 1, and UE 115 may be UE 115c or 115d operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIGS. 6 and 8, or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

Figure 3:
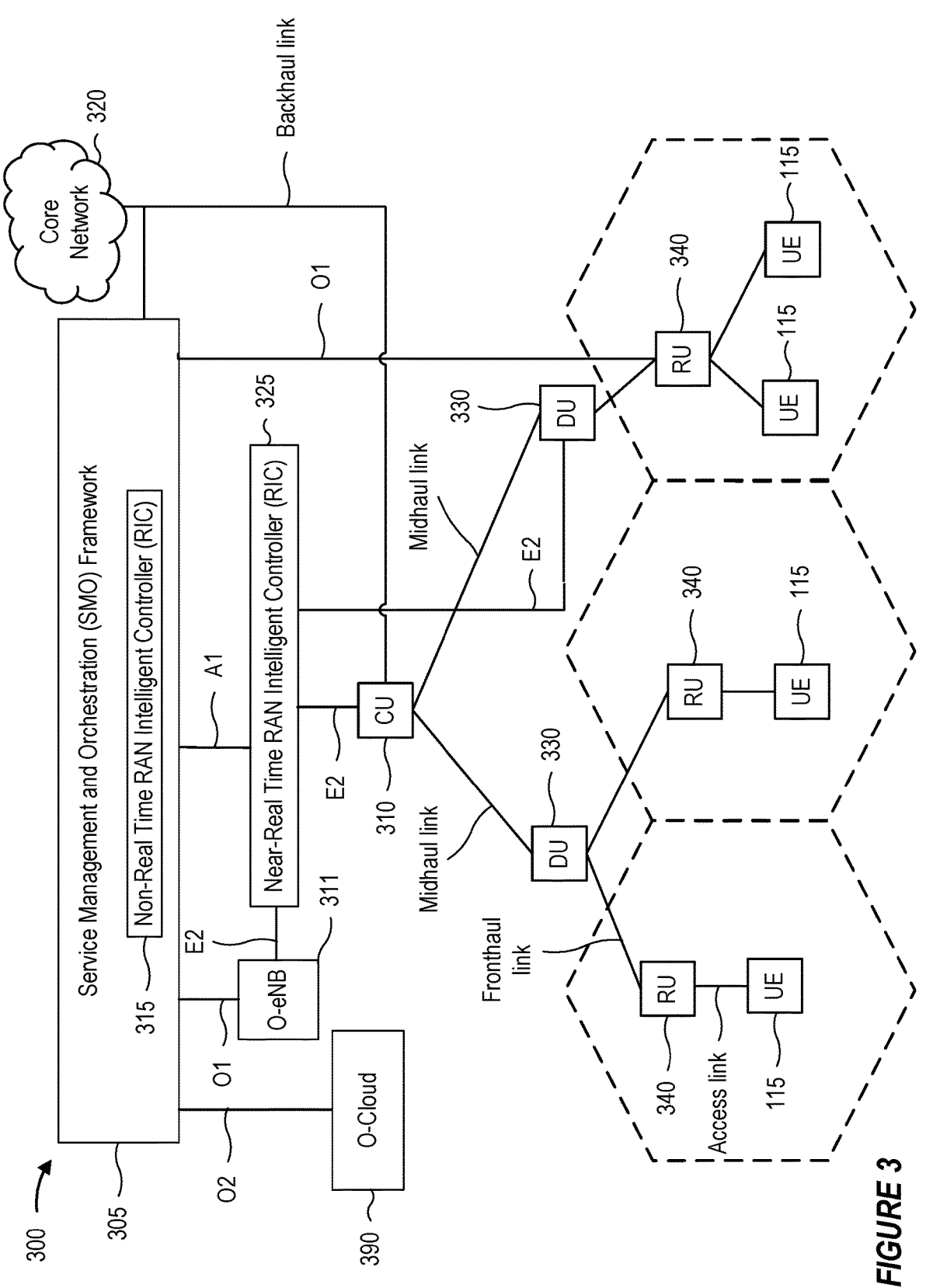
FIG. 3 shows a diagram illustrating an example disaggregated base station architecture according to one or more aspects.

FIG. 3 shows a diagram illustrating an example disaggregated base station 300 architecture. The disaggregated base station 300 architecture may include one or more central units (CUs) 310 that can communicate directly with a core network 320 via a backhaul link, or indirectly with the core network 320 through one or more disaggregated base station units (such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 115 via one or more radio frequency (RF) access links. In some implementations, the UE 115 may be simultaneously served by multiple RUs 340.

Each of the units, i.e., the CUs 310, the DUs 330, the RUs 340, as well as the Near-RT RICs 325, the Non-RT RICs 315 and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (i.e., Central Unit-User Plane (CU-UP)), control plane functionality (i.e., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 115. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

As described herein, a node (which may be referred to as a node, a network node, a network entity, or a wireless node) may include, be, or be included in (e.g., be a component of) a base station (e.g., any base station described herein), a transmission and reception point (TRP), a UE (e.g., any UE described herein), a network controller, an apparatus, a device, a computing system, an integrated access and back-hauling (IAB) node, a distributed unit (DU), a central unit (CU), a remote unit (RU), a core network, a LFM, and/or a another processing entity configured to perform any of the techniques described herein. For example, a network node may be a UE. As another example, a network node may be a base station or network entity. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE is configured to receive information from a base station also discloses that a first network node is configured to receive information from a second network node, the first network node may refer to a first UE, a first base station, a first apparatus, a first device, a first computing system, a first one or more components, a first processing entity, or the like configured to receive the information; and the second network node may refer to a second UE, a second base station, a second apparatus, a second device, a second computing system, a second one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

Figure 4:
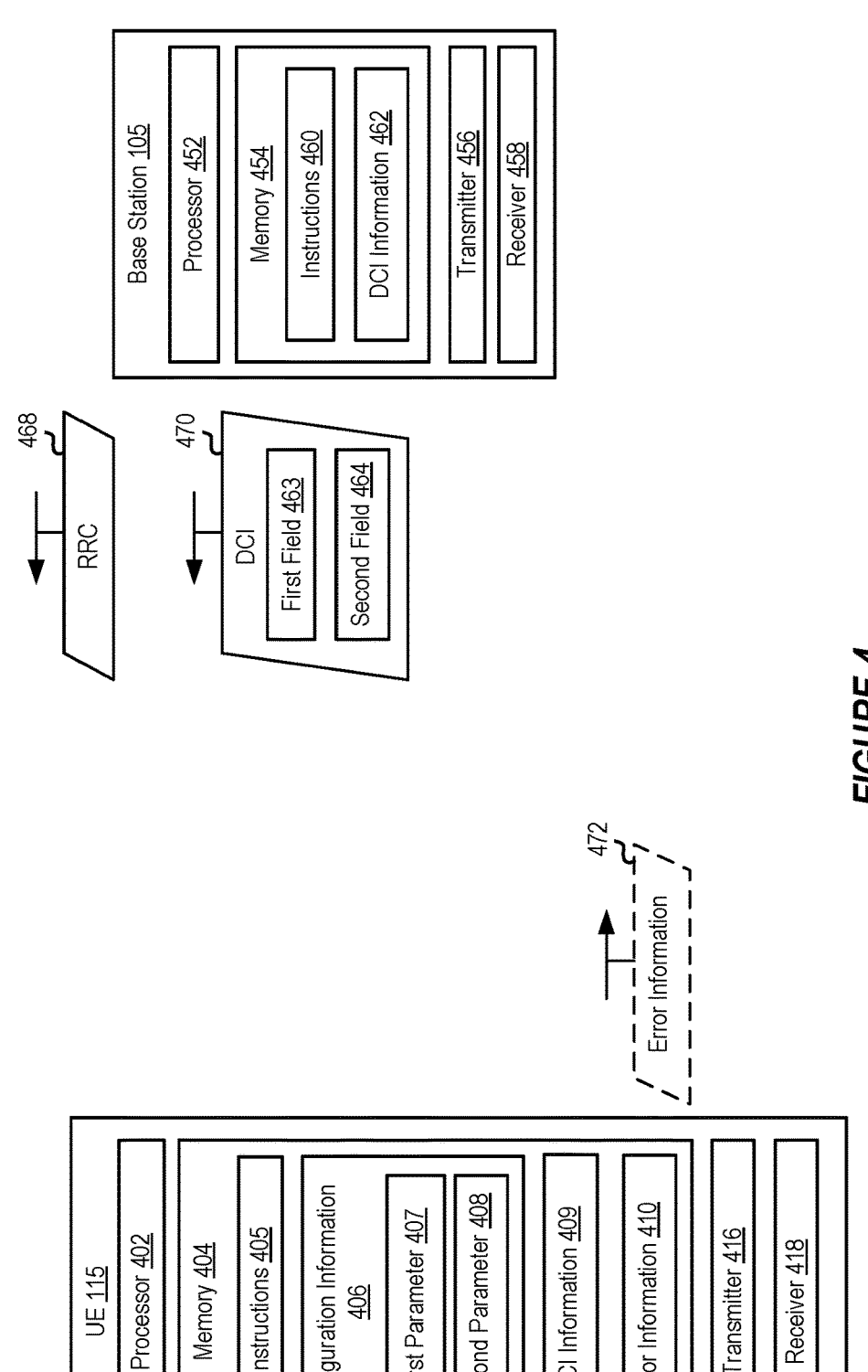
FIG. 4 is a block diagram illustrating an example wireless communication system that supports a bandwidth part (BWP) switch request according to one or more aspects.

FIG. 4 is a block diagram of an example wireless communications system 400 that supports a BWP switch request according to one or more aspects. In some examples, wireless communications system 400 may implement aspects of wireless network 100. Wireless communications system 400 includes UE 115 and base station 105. Although one UE 115 and one base station 105 are illustrated, in some other implementations, wireless communications system 400 may generally include multiple UEs 115, multiple base station 105, or a combination thereof.

UE 115 may include a variety of components (such as structural, hardware components) used for carrying out one or more functions described herein. For example, these components may include one or more processors 402 (hereinafter referred to collectively as "processor 402"), one or more memory devices 404 (hereinafter referred to collectively as "memory 404"), one or more transmitters 416 (hereinafter referred to collectively as "transmitter 416"), and one or more receivers 418 (hereinafter referred to collectively as "receiver 418"). In some implementations, UE 115 may include an interface (e.g., a communication interface) that includes transmitter 416, receiver 418, or a combination thereof. Processor 402 may be configured to execute instructions 405 stored in memory 404 to perform the operations described herein. In some implementations, processor 402 includes or corresponds to one or more of receive processor 258, transmit processor 264, and controller 280, and memory 404 includes or corresponds to memory 282.

Memory 404 includes or is configured to store instructions 405, configuration information 406, DCI information 409, and error information 410. Configuration information 406 may include or indicate a configuration of UE 115, such as a configuration based on RRC (e.g., 468). Configuration information 406 may include first parameter 407 and second parameter 408. First parameter 407 may include or indicate one or more first parameters that are common to one or more BWPs (e.g., a non-BWP specific parameter), such as a carrier indicator, a modulation and coding scheme, precoding information and a number of layers, a number of antenna ports, or a combination thereof, as illustrative, non-limiting examples. Second parameter 408 may include or indicate one or more second parameters that correspond to the first BWP (e.g., a BWP specific parameter), such as a first frequency domain resource assignment field, a first time domain resource assignment field, or a combination thereof. DCI information 409 may include or indicate information based on DCI, such as DCI 470. Error information 410 may include or indicate a value of a field found to be invalid, the field, a reason the value or the field is invalid, a BWP, or a combination thereof.

Transmitter 416 is configured to transmit reference signals, control information and data to one or more other devices, and receiver 418 is configured to receive references signals, synchronization signals, control information and data from one or more other devices. For example, transmitter 416 may transmit signaling, control information and data to, and receiver 418 may receive signaling, control information and data from, base station 105. In some implementations, transmitter 416 and receiver 418 may be integrated in one or more transceivers. Additionally or alternatively, transmitter 416 or receiver 418 may include or correspond to one or more components of UE 115 described with reference to FIG. 2.

In some implementations, UE 115 may include one or more antenna arrays. The one or more antenna arrays may be coupled to transmitter 416, receiver 418, or a communication interface. The antenna array may include multiple antenna elements configured to perform wireless communications with other devices, such as with the base station 105. In some implementations, the antenna array may be configured to perform wireless communications using different beams, also referred to as antenna beams. The beams may include TX beams and RX beams. To illustrate, the antenna array may include multiple independent sets (or subsets) of antenna elements (or multiple individual antenna arrays), and each set of antenna elements of the antenna array may be configured to communicate using a different respective beam that may have a different respective direction than the other beams. For example, a first set of antenna elements of the antenna array may be configured to communicate via a first beam having a first direction, and a second set of antenna elements of the antenna array may be configured to communicate via a second beam having a second direction. In other implementations, the antenna array may be configured to communicate via more than two beams. Alternatively, one or more sets of antenna elements of the antenna array may be configured to concurrently generate multiple beams, for example using multiple RF chains of the UE 115. Each individual set (or subset) of antenna elements may include multiple antenna elements, such as two antenna elements, four antenna elements, ten antenna elements, twenty antenna elements, or any other number of antenna elements greater than two. Although described as an antenna array, in other implementations, the antenna array may include or correspond to multiple antenna panels, and each antenna panel may be configured to communicate using a different respective beam.

UE 115 may include one or more components as described herein with reference to UE 115. In some implementations, UE 115 is a 5G-capable UE, a 6G-capable UE, or a combination thereof.

Base station 105 may include a variety of components (such as structural, hardware components) used for carrying out one or more functions described herein. For example, these components may include one or more processors 452 (hereinafter referred to collectively as "processor 452"), one or more memory devices 454 (hereinafter referred to collectively as "memory 454"), one or more transmitters 456 (hereinafter referred to collectively as "transmitter 456"), and one or more receivers 458 (hereinafter referred to collectively as "receiver 458"). In some implementations, base station 105 may include an interface (e.g., a communication interface) that includes transmitter 456, receiver 458, or a combination thereof. Processor 452 may be configured to execute instructions 460 stored in memory 454 to perform the operations described herein. In some implementations, processor 452 includes or corresponds to one or more of receive processor 238, transmit processor 220, and controller 240, and memory 454 includes or corresponds to memory 242.

Memory 454 includes or is configured to store instructions 460 and DCI information 462. DCI information may include or correspond to DCI information 409 or DCI 470.

Transmitter 456 is configured to transmit reference signals, synchronization signals, control information and data to one or more other devices, and receiver 458 is configured to receive reference signals, control information and data from one or more other devices. For example, transmitter 456 may transmit signaling, control information and data to, and receiver 458 may receive signaling, control information and data from, UE 115. In some implementations, transmitter 456 and receiver 458 may be integrated in one or more transceivers. Additionally or alternatively, transmitter 456 or receiver 458 may include or correspond to one or more components of base station 105 described with reference to FIG. 2.

In some implementations, base station 105 may include one or more antenna arrays. The antenna array may include multiple antenna elements configured to perform wireless communications with other devices, such as with the UE 115. In some implementations, the antenna array may be configured to perform wireless communications using different beams, also referred to as antenna beams. The beams may include TX beams and RX beams. To illustrate, the antenna array may include multiple independent sets (or subsets) of antenna elements (or multiple individual antenna arrays), and each set of antenna elements of the antenna array may be configured to communicate using a different respective beam that may have a different respective direction than the other beams. For example, a first set of antenna elements of the antenna array may be configured to communicate via a first beam having a first direction, and a second set of antenna elements of the antenna array may be configured to communicate via a second beam having a second direction. In other implementations, the antenna array may be configured to communicate via more than two beams. Alternatively, one or more sets of antenna elements of the antenna array may be configured to concurrently generate multiple beams, for example using multiple RF chains of the base station 105. Each individual set (or subset) of antenna elements may include multiple antenna elements, such as two antenna elements, four antenna elements, ten antenna elements, twenty antenna elements, or any other number of antenna elements greater than two. Although described as an antenna array, in other implementations, the antenna array may include or correspond to multiple antenna panels, and each antenna panel may be configured to communicate using a different respective beam.

In some implementations, wireless communications system 400 implements a 5G NR network. For example, wireless communications system 400 may include multiple 5G-capable UEs 115 and multiple 5G-capable base stations 105, such as UEs and base stations configured to operate in accordance with a 5G NR network protocol such as that defined by the 3GPP. In some other implementations, wireless communications system 400 implements a 6G network.

During operation of wireless communications system 400, UE 115 may receive RRC 468 from base station 105 and may configure UE 115 based on RRC. For example, UE 115 may configure UE 115 based on one or more first parameters that are common to one or more BWPs (e.g., a non-BWP specific parameter), such as a carrier indicator, a modulation and coding scheme, precoding information and a number of layers, a number of antenna ports, or a combination thereof, as illustrative, non-limiting examples. For example, the one or more first parameters may include or correspond to configuration information 406 or first parameter 407. To illustrate, the one or more first parameters may be common to all BWPs while UE is configured based on RRC 468 and according to the one or more first parameters. Additionally, or alternatively, UE 115 may configure UE 115 to use a first BWP based on RRC 468. The first BWP may include or correspond to one or more second parameters that correspond to the first BWP (e.g., a BWP specific parameter), such as a first frequency domain resource assignment field, a first time domain resource assignment field, or a combination thereof. For example, the one or more second parameters may include or correspond to configuration information 406 or second parameter 408. In some implementations, RRC 468 includes or indicates the one or more first parameters, the one or more second parameters, or a combination thereof. Additionally, or alternatively, RRC 468 may include or indicate a bandwidth part indicator, such as a bandwidth part indicator that indicates the first BWP. In some implementations, the bandwidth part indicator may be included in the one or more second parameters; while in other implementations, the bandwidth part indicator may be separate from the one or more second parameters. After configuring UE 115 based on RRC 468, UE 115 may communicate with base station 105 using the first BWP.

UE 115 may receive DCI 470 from base station 105. For example, UE 115 may receive DCI 470 using the first BWP. DCI 470 may include a first field 463, a second field 464, or a combination thereof. First field 463 may include or indicate one or more common parameters, such as one or more non-BWP specific parameters. Second field 464 may include or indicate one or more parameters, such as one or more BWP specific parameters. Additionally, or alternatively, DCI may include a bandwidth part indicator. In some implementations, the bandwidth part indicator is included in or indicated by the second field 464. The bandwidth part indicator of DCI 470 may include or indicate a second BWP. Additionally, the one or more BWP specific parameters may be associated with or correspond to the second BWP.

In some implementations, DCI 470 includes or is a DL DCI. Additionally, or alternatively, DCI 470 may include or indicate a DL grant, may have a format 1_0, may schedule a PDSCH, or a combination thereof. When DCI 470 includes or is the DL DCI, one or more fields of DCI 470 may include an identifier for DCI formats, a carrier indicator, a bandwidth part indicator, a frequency domain resource assignment, a time domain resource assignment, a VRB-to-PRB mapping, a PRB bundling size indicator, a rate matching indicator, a modulation and coding scheme, a new data indicator, a redundancy version, a HARQ process number, a PDSCH-to-HARQ_feedback timing indicator, antenna ports, a transmission configuration indication, or a combination thereof. In some implementations, when DCI 470 includes or is the DL DCI, first field 463 may include a carrier indicator field, an antenna ports field, or a combination thereof. Additionally, or alternatively, when DCI 470 includes or is the DL DCI, second field 464 may include a frequency domain resource assignment field, a time domain resource assignment field, or a combination thereof.

In some implementations, DCI 470 includes or is a UL DCI. Additionally, or alternatively, the DCI may include or indicate a UL grant, may have a format 0_1, may schedule a PUSCH, or a combination thereof. When DCI 470 includes or is the UL DCI, one or more fields of DCI 470 may include an identifier for DCI formats, a carrier indicator, a UL/SUL indicator, a bandwidth part indicator, a frequency domain resource assignment, a time domain resource assignment, a frequency hopping flag, a modulation and coding scheme, a new data indicator, a redundancy version, an HARQ process number a $1^{st}$ downlink assignment index, a $2^{nd}$ downlink assignment index, a TPC command for scheduled PUSCH, an SRS resource indicator, precoding information and number of layers, antenna ports, an SRS request, a CSI request, CBG transmission information, a PTRS-DMRS association, a beta_offest indicator, a DMRS sequence initialization, a UL-SCH indicator, or a combination thereof. In some implementations, when the DCI includes or is the UL DCI, first field 463 may include a carrier indicator field, a modulation and coding scheme field, a precoding information and number of layers field, an antenna ports field, or a combination thereof. Additionally, or alternatively, when DCI 470 includes or is the UL DCI, second field 464 may include a frequency domain resource assignment field, a time domain resource assignment field, or a combination thereof.

In some implementations, UE 115 parses DCI 470 to identify one or more fields of a plurality of fields of DCI 470. To illustrate, the plurality of fields may include first field 463, second field 464, a bandwidth part indicator field, or a combination thereof. First field 463 may include or correspond to first parameter 407, DCI information 409, or DCI information 462. Additionally, or alternatively, second field 464 may include or correspond to second parameter 408, DCI information 409, or DCI information 462. The UE may determine whether or not DCI 470 indicates a BWP switch request based on a value of the bandwidth part indicator field. For example, the BWP switch request may indicate for or request UE 115 to switch to a second BWP. Additionally, or alternatively, UE 115 may determine a value of or indicated by at least one field of the plurality of fields. UE 115 may store information, such as DCI information 409, that includes or indicates DCI 470, one or more fields parsed from DCI 470, one or more values of the one or more fields, or a combination thereof.

Based on a determination that DCI 470 includes or indicates the BWP switch request, UE 115 may validate first field 463, such as a first value of first field 463. For example, UE 115 may perform a comparison based on the one or more first parameters associated with RRC 468 and first field 463.

In some implementations, based on a determination that the first value of first field 463 is invalid, UE 115 maintains the first BWP. Additionally, or alternatively, based on the determination that the first value of first field 463 is invalid, UE 115 generates error information 410 or 472 that indicates first field 463 is invalid. For example, error information 410 or 472 may include or indicate a reason first field 463 is invalid, the first value, first field 463, the first BWP, the second BWP, or a combination thereof. Additionally, or alternatively error information 410 or 472 may include or correspond to a prune status indicator generated by UE 115 based on processing DCI 470. In some implementation, UE 115 transmits an indicator (e.g., 472) that includes or indicates error information 410. For example, the UE may transmit the indicator to base station 105. Additionally, or alternatively, based on the determination that the first value of first field 463 is invalid, UE 115 may discard DCI information 409 that is based on or associated with DCI 470.

In some implementations, based on a determination that the first value of first field 463 is valid, UE 115 performs the BWP switch from the first BWP to a second BWP. After the BWP switch to the second BWP, UE 115 may determine whether a second value of second field 464 of DCI 470 is valid. For example, UE 115 may perform a comparison based on the one or more second parameters associated with RRC 468 and second field 464, such as information of second field 464 stored as DCI information 409. In some implementations, second field 464 is a BWP specific field. Second field 464 may include a frequency domain resource assignment field, a time domain resource assignment field, or a combination thereof.

In some implementations, based on a determination that the second value of second field 464 is invalid, UE 115 performs another BWP switch from the second BWP to the first BWP. Additionally, or alternatively, based on a determination that the second value of second field 464 is invalid, UE 115 may generate error information 410 or 472 that indicates second field 464 is invalid. In some implementation, the UE transmits an indicator (e.g., 472) that includes or indicates error information 410. For example, the UE may transmit the indicator (e.g., 472) to base station 105. Additionally, or alternatively, based on the determination that the second value of second field 464 is invalid, UE 115 may discard DCI information 409 that is based on or associated with DCI 470.

In some implementations, based on a determination that the second value of second field 464 is valid, UE 115 communicates using the second BWP. For example, UE 115 may communicate with base station 105 via the second BWP.

As described with reference to FIG. 4, the present disclosure provides techniques for supporting a BWP switch request. The techniques described may mitigate or prevent band and forth switching of BWPs based on the first value of first field 463 being invalid. In such circumstances (e.g., the first value of first field 463 being invalid), UE 115 may avoid redundant switching during which UE 115 would lose reception time or unable to communicate (e.g., miss one or more grants).

Figure 5:
FIG. 5 is a flow diagram illustrating an example process that supports a BWP switch request according to one or more aspects.
Figure 5:
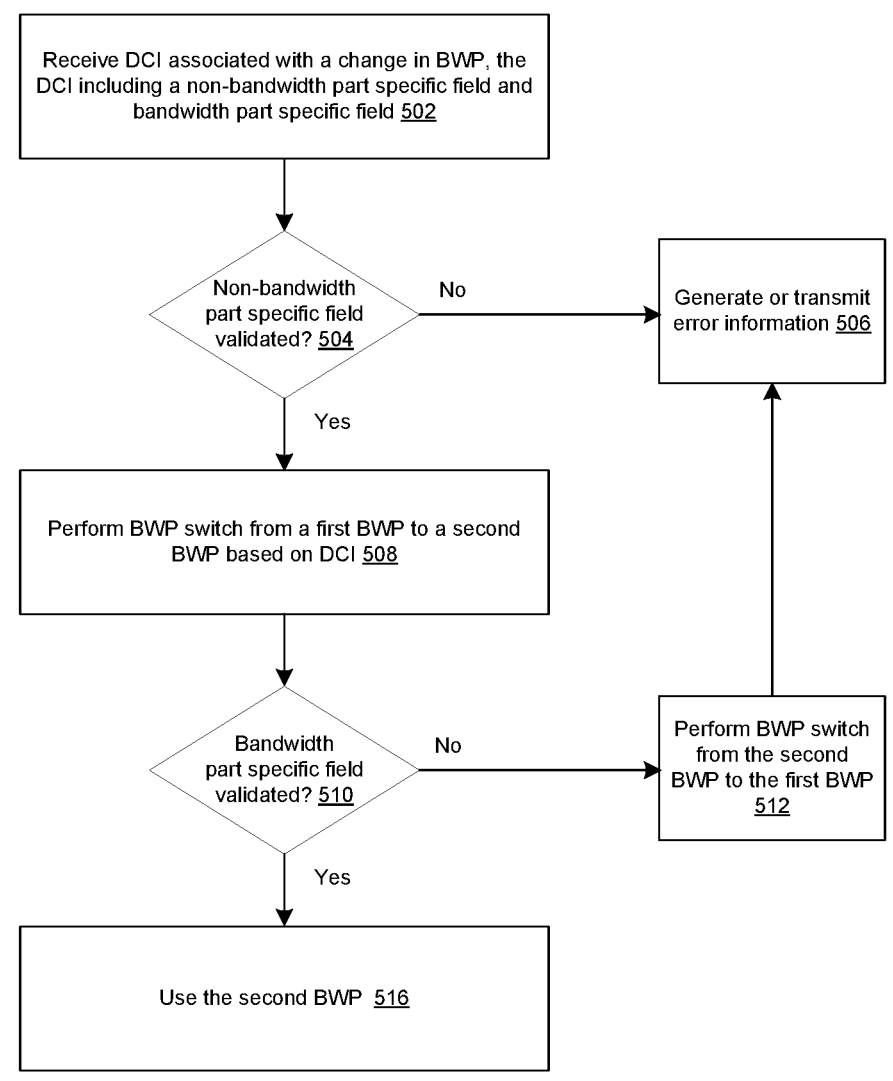

FIG. 5 is a flow diagram illustrating an example process 500 that supports a BWP switch request according to one or more aspects. Operations of process 500 may be performed by a UE, such as UE 115 described above with reference to FIGS. 1-4 or a UE described with reference to FIG. 7. For example, example operations (also referred to as "blocks") of process 500 may enable UE 115 to support a BWP switch request.

In block 502, the UE receives DCI associated with a change in BWP. The DCI may include or correspond to DCI 470. The DCI may include a non-bandwidth part specific field and a bandwidth part specific field. For example, the non-bandwidth part specific field and the bandwidth part specific field may include or correspond to first field 463 and second field, respectively. In some implementations, the DCI is received from a base station, such as base station 105.

In block 504, the UE determines whether the non-bandwidth part specific field is validated. In some implementations, when the DCI includes a UL DCI, the first field includes a carrier indicator field, a modulation and coding scheme field, a precoding information and number of layers field, an antenna ports field, or a combination thereof. Alternatively, when the DCI includes a DL DCI, the first field includes a carrier indicator field, an antenna ports field, or a combination thereof.

If the non-bandwidth part specific field is invalid, process 500 advances to block 506 and the UE generates or transmits error information. For example, the error information may include or correspond to error information 472. Alternatively, if the non-bandwidth part specific field is valid, the method advances to block 508. In block 508, the UE performs a BWP switch from a first BWP to a second BWP based on the DCI.

In block 510, the UE determines whether the bandwidth part specific field is validated. For example, the bandwidth part specific field may include a frequency domain resource assignment field, a time domain resource assignment field, or a combination thereof. If the bandwidth part specific field is valid, process 500 advances to block 516 and the UE uses the second BWP. Alternatively, if the bandwidth part specific field is invalid, the method advances to block 512.

In block 512, the UE performs another BWP switch from the second BWP to the first BWP. After block 512, the process 500 advanced to block 506 and the UE generates or transmits error information.

Figure 6:
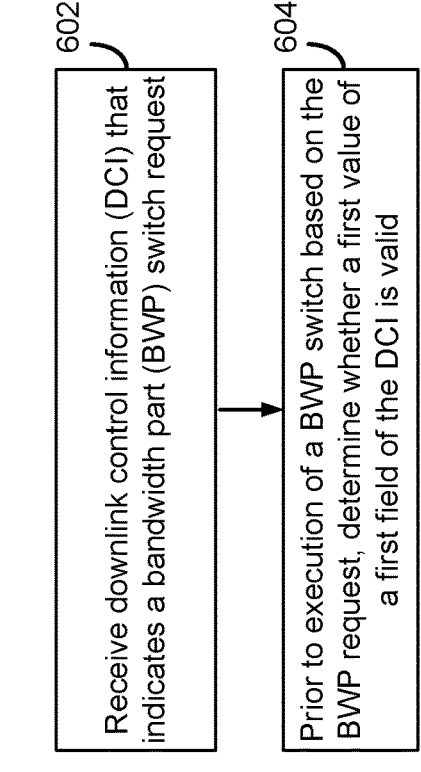
FIG. 6 is a flow diagram illustrating an example process that supports a BWP switch request according to one or more aspects.

FIG. 6 is a flow diagram illustrating an example process 600 that supports a BWP switch request according to one or more aspects. Operations of process 600 may be performed by a UE, such as UE 115 described above with reference to FIGS. 1-4 or a UE described with reference to FIG. 7. For example, example operations (also referred to as "blocks") of process 600 may enable UE 115 to support a BWP switch request.

In block 602, the UE receives DCI that indicates a BWP switch request. For example, the DCI may include or correspond to DCI information 409 or DCI 470. In some implementations, the DCI is received from base station 105.

In block 604, the UE, prior to execution of a BWP switch based on the BWP request, determines whether a first value of a first field of the DCI is valid. The first field may include or correspond to first parameter 407, first field 463, or DCI information 409.

In some implementations, prior to receiving the DCI, the UE configures the UE for a first BWP. To illustrate, the UE may configured the UE for the first BWP and may communicate using the first BWP. Additionally, or alternatively, the UE may receive the DCI using or via the first BWP.

In some implementations, UE parses the DCI to identify one or more fields of a plurality of fields of the DCI. To illustrate, the plurality of fields may include the first field, a second field, and a bandwidth part indicator field. For example, the second field may include or correspond to second parameter 408, second field 464, or DCI information 409. In some implementations, the first field is a non-BWP specific field and the second field is a BWP specific field. The UE may determine whether or not the DCI indicates the BWP switch request based on a value of the bandwidth part indicator field.

In some implementations, the DCI includes a UL DCI. In some such implementations, such as when the DCI includes the UL DCI, the first field includes a carrier indicator field, a modulation and coding scheme field, a precoding information and number of layers field, an antenna ports field, or a combination thereof. In some other implementations, the CI includes a DL DCI. In some such implementations, such as when the DCI includes the DL DCI, the first field includes a carrier indicator field, an antenna ports field, or a combination thereof.

In some implementations, based on a determination that the first value of the first field is invalid, the UE maintains the first BWP. Additionally, or alternatively, based on the determination that the first value of the first field is invalid, the UE generates error information that indicates the first field is invalid. For example, the error information may include or correspond to error information 410 or 472. In some implementation, the UE transmits an indicator (e.g., 472) that includes or indicates the error information. For example, the UE may transmit the indicator to base station 105.

In some implementations, based on a determination that the first value of the first field is valid, the UE performs the BWP switch from the first BWP to a second BWP. After the BWP switch to the second BWP, the UE may determine whether a second value of the second field of the DCI is valid. In some implementations, the second field is a BWP specific field. The second field may include a frequency domain resource assignment field, a time domain resource assignment field, or a combination thereof.

In some implementations, based on a determination that the second value of the second field is invalid, the UE performs another BWP switch from the second BWP to the first BWP. Additionally, or alternatively, based on a determination that the second value of the second field is invalid, the UE may generate error information that indicates the second field is invalid. For example, the error information may include or correspond to error information 410 or 472. In some implementation, the UE transmits an indicator (e.g., 472) that includes or indicates the error information. For example, the UE may transmit the indicator to base station 105.

In some implementations, based on a determination that the second value of the second field is valid, the UE communicates using the second BWP. For example, the UE may communicate with base station 105 via the second BWP.

Figure 7:
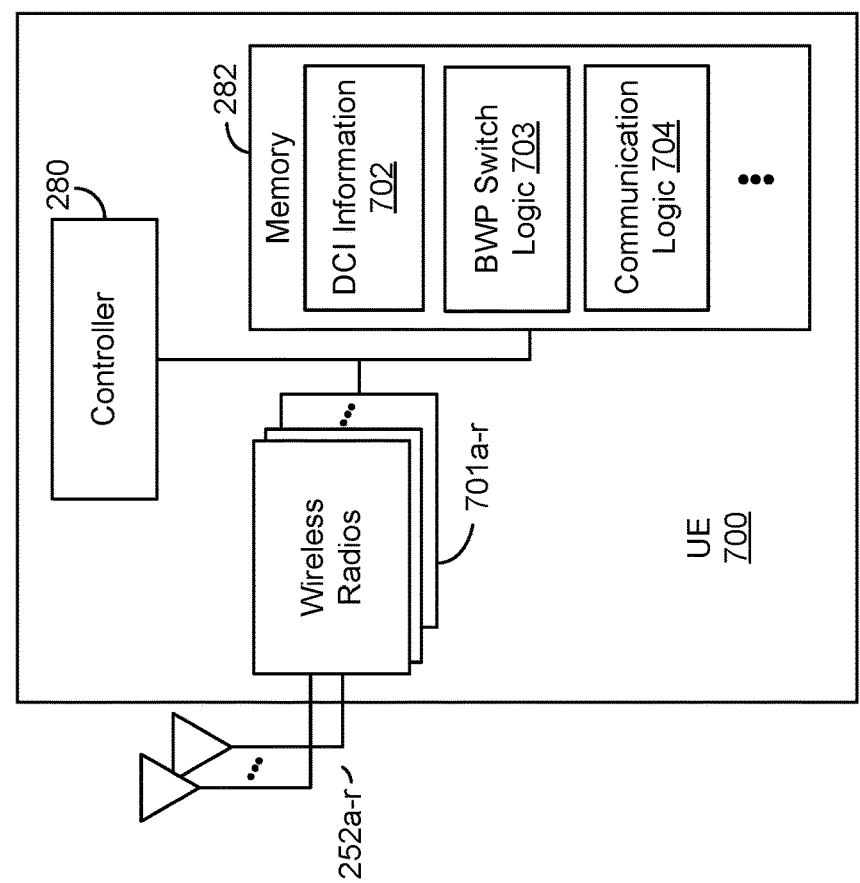
FIG. 7 is a block diagram of an example UE that supports a BWP switch request according to one or more aspects.

FIG. 7 is a block diagram of an example UE 700 that supports a BWP switch request according to one or more aspects. UE 700 may be configured to perform operations, including the blocks of a process described with reference to FIG. 5 or 6. In some implementations, UE 700 includes the structure, hardware, and components shown and described with reference to UE 115 of FIGS. 1-4. For example, UE 700 includes controller 280, which operates to execute logic or computer instructions stored in memory 282, as well as controlling the components of UE 700 that provide the features and functionality of UE 700. UE 700, under control of controller 280, transmits and receives signals via wireless radios 701*a-r* and antennas 252*a-r*. Wireless radios 701*a-r* include various components and hardware, as illustrated in FIG. 2 for UE 115, including modulator and demodulators 254*a-r*, MIMO detector 256, receive processor 258, transmit processor 264, and TX MIMO processor 266.

As shown, memory 282 may include DCI information 702, BWP switch logic 703, and communication logic 704. DCI information 702 may include or correspond to configuration information 406, DCI information 409, error information 410, DCI information 462, or error information 472. BWP switch logic 703 may be configured to. Communication logic 704 may be configured to enable communication between UE 700 and one or more other devices. UE 700 may receive signals from or transmit signals to one or more network entities, such as base station 105 of FIGS. 1-4 or a base station as illustrated in FIG. 9.

Figures 8, 9:
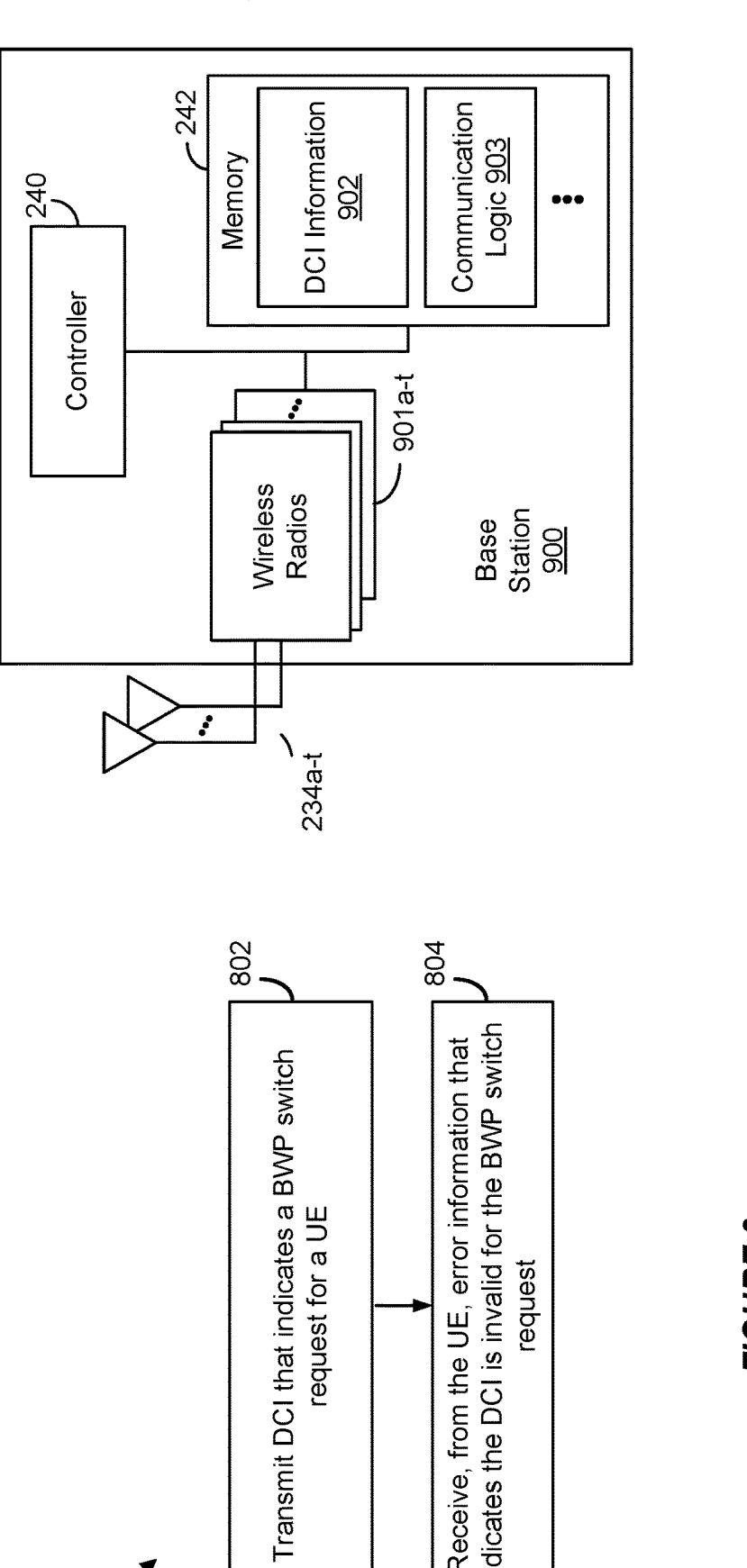
FIG. 8 is a flow diagram illustrating an example process that supports a BWP switch request according to one or more aspects.
FIG. 9 is a block diagram of an example base station that supports a BWP switch request according to one or more aspects.

FIG. 8 is a flow diagram illustrating an example process 800 that supports a BWP switch request according to one or more aspects. Operations of process 800 may be performed by a base station, such as base station 105 described above with reference to FIGS. 1-4 or a base station as described above with reference to FIG. 9. For example, example operations of process 800 may enable base station 105 to support a BWP switch request.

At block 802, the base station transmits DCI that indicates a BWP switch request for a UE. For example, the DCI may include or correspond to DCI 470. The UE may include or correspond to UE 115. In some implementations, the DCI is transmitted using a first BWP. Additionally, or alternatively, the DCI may indicate to switch to a second BWP.

The DCI may include a plurality of fields, such as first field, a second field, and a bandwidth part indicator field. The first field and the second field may include or correspond to first field 463 and second field 464, respectively. In some implementations, the first field is a non-BWP specific field, the second field is a BWP specific field, or a combination thereof. For example, the second field may include a frequency domain resource assignment field, a time domain resource assignment field, or a combination thereof. Additionally, or alternatively, the DCI indicates the BWP switch request based on a value of the bandwidth part indicator field.

In some implementations, the DCI includes or is a UL DCI. Additionally, or alternatively, the DCI may include or indicate a UL grant, may have a format 0_1, may schedule a PUSCH, or a combination thereof. In some implementations, when the DCI includes or is the UL DCI, the first field include a carrier indicator field, a modulation and coding scheme field, a precoding information and number of layers field, an antenna ports field, or a combination thereof.

In some implementations, the DCI includes or is a DL DCI. Additionally, or alternatively, the DCI may include or indicate a DL grant, may have a format 1_0, may schedule a PDSCH, or a combination thereof. In some implementations, when the DCI includes or is the DL DCI, the first field may include a carrier indicator field, an antenna ports field, or a combination thereof.

At block 804, the base station receives, from the UE, error information that indicates that the DCI is invalid for the BWP switch request. For example, the error information may include or correspond to error information 472. In some implementations, the error information is received using the first BWP. The error information may indicate that the first field is invalid, the second field is invalid, or a combination thereof. The error information may be received from the UE after the UE receives the DCI, without the UE performing the BWP switch from the first BWP to the second BWP, or a combination thereof.

In some implementations, the base station determines whether the DCI is valid based on the error information. Additionally, or alternatively, the base station may generate, based on the error information, another DCI that indicates another BWP switch request for the UE.

In some implementations, the base station transmits RRC that indicates a first BWP, a common BWP parameter, or a combination thereof. The common BWP parameter may include or correspond to a non-BWP specific field, such as a field that is common to multiple BWPs—e.g., the first BWP and the second BWP. Additionally, or alternatively, the base station may receive first data using the first BWP. For example, the base station may receive the first data from the UE. To illustrate, the base station may receive the first data after transmission of the RRC, before transmission of the DCI, after transmission mission of the DCI, before receipt of the error information, or after receipt of the error information.

FIG. 9 is a block diagram of an example base station 900 that supports a BWP switch request according to one or more aspects. Base station 900 may be configured to perform operations, including the blocks of process 800 described with reference to FIG. 8. In some implementations, base station 900 includes the structure, hardware, and components shown and described with reference to base station 105 of FIGS. 1-4. For example, base station 900 may include controller 240, which operates to execute logic or computer instructions stored in memory 242, as well as controlling the components of base station 900 that provide the features and functionality of base station 900. Base station 900, under control of controller 240, transmits and receives signals via wireless radios 901*a-t* and antennas 234*a-t*. Wireless radios 901*a-t* include various components and hardware, as illustrated in FIG. 2 for base station 105, including modulator and demodulators 232*a-t*, transmit processor 220, TX MIMO processor 230, MIMO detector 236, and receive processor 238.

As shown, the memory 242 may include DCI information 902 and communication logic 903. DCI information 902 may include or correspond to configuration information 406, DCI information 409, error information 410, DCI information 462, or error information 472. Communication logic 903 may be configured to enable communication between base station 900 and one or more other devices. Base station 900 may receive signals from or transmit signals to one or more UEs, such as UE 115 of FIGS. 1-4 or UE 700 of FIG. 7.

It is noted that one or more blocks (or operations) described with reference to FIG. 5, 6, or 8 may be combined with one or more blocks (or operations) described with reference to another of the figures. For example, one or more blocks (or operations) of FIG. 5 may be combined with one or more blocks (or operations) of FIG. 6. As another example, one or more blocks associated with FIG. 5 may be combined with one or more blocks associated with FIG. 8. As another example, one or more blocks associated with FIG. 6 may be combined with one or more blocks associated with FIG. 8. As another example, one or more blocks associated with FIG. 5, 6, or 8 may be combined with one or more blocks (or operations) associated with FIGS. 1-4. Additionally, or alternatively, one or more operations described above with reference to FIGS. 1-4 may be combined with one or more operations described with reference to FIG. 7 or 9.

In one or more aspects, techniques for supporting a BWP switch request may include additional aspects, such as any single aspect or any combination of aspects described below or in connection with one or more other processes or devices described elsewhere herein. In a first aspect, techniques for supporting a BWP switch request may include receiving DCI that indicates a BWP switch request. The techniques may further include, prior to execution of a BWP switch based on the BWP request, determining whether a first value of a first field of the DCI is valid. In some examples, the techniques in the first aspect may be implemented in a method or process. In some other examples, the techniques of the first aspect may be implemented in a wireless communication device, which may include a UE or a component of a UE. In some examples, the wireless communication device may include at least one processing unit or system (which may include an application processor, a modem or other components) and at least one memory device coupled to the processing unit. The processing unit may be configured to perform operations described herein with respect to the wireless communication device. In some examples, the memory device includes a non-transitory computer-readable medium having program code stored thereon that, when executed by the processing unit, is configured to cause the wireless communication device to perform the operations described herein. Additionally, or alternatively, the wireless communication device may include an interface (e.g., a wireless communication interface) that includes a transmitter, a receiver, or a combination thereof. Additionally, or alternatively, the wireless communication device may include one or more means configured to perform operations described herein.

In a second aspect, in combination with the first aspect, the techniques further parsing the DCI to identify one or more fields of a plurality of fields, the plurality of fields include the first field, a second field, and a bandwidth part indicator field.

In a third aspect, in combination with the second aspect, the techniques further include determining that the DCI indicates the BWP switch request based on a value of the bandwidth part indicator field.

In a fourth aspect, in combination with the second aspect or the third aspect, the first field is a non-BWP specific field and the second field is a BWP specific field.

In a fifth aspect in combination with one or more of the first aspect through the fourth aspect, the DCI includes a UL DCI.

In a sixth aspect, in combination with the fifth aspect, the first field includes a carrier indicator field, a modulation and coding scheme field, a precoding information and number of layers field, an antenna ports field, or a combination thereof.

In a seventh aspect, in combination with one or more of the first aspect through the fourth aspect, the DCI includes a DL DCI.

In an eighth aspect, in combination with the seventh aspect, the first field includes a carrier indicator field, an antenna ports field, or a combination thereof.

In a ninth aspect, in combination with one or more of the first aspect through the eighth aspect, the techniques further include, prior to receiving the DCI, configuring the UE for a first BWP.

In a tenth aspect, in combination with the ninth aspect, the techniques further include, based on a determination that the first value of the first field is invalid, maintaining the first BWP.

In an eleventh aspect, in combination with the tenth aspect, the techniques further include generating error information that indicates the first field is invalid.

In a twelfth aspect, in combination with one or more of the first aspect through the eighth aspect, the techniques further include, based on a determination that the first value of the first field is valid, performing the BWP switch from a first BWP to a second BWP.

In a thirteenth aspect, in combination with the twelfth aspect, the techniques further include, after the BWP switch to the second BWP, determining whether a second value of a second field of the DCI is valid.

In a fourteenth aspect, in combination with the thirteenth aspect, the second field is a BWP specific field.

In a fifteenth aspect, in combination with the thirteenth aspect or the fourteenth aspect, the second field includes a frequency domain resource assignment field, a time domain resource assignment field, or a combination thereof.

In a sixteenth aspect, in combination with the thirteenth aspect or the fourteenth aspect, the techniques further include, based on a determination that the second value of the second field is invalid, performing another BWP switch from the second BWP to the first BWP.

In a seventeenth aspect, in combination with the fifteenth aspect, the techniques further include generating error information that indicates the second field is invalid.

In an eighteenth aspect, in combination with the thirteenth aspect or the fourteenth aspect, the techniques further include, based on a determination that the second value of the second field is valid: communicating using the second BWP.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-9 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication performed by a user equipment (UE), the method comprising:
  receiving a radio resource control (RRC) signaling that comprises one or more non-bandwidth part (non-BWP) specific parameters;
  receiving, on a first BWP, downlink control information (DCI) that indicates one or more resource assignments to the UE and a BWP switch request;
  validating a resource grant by comparing one or more fields of the DCI with the one or more non-BWP specific parameters; and switching to a second BWP or maintaining the first BWP based on a result of the validating;
  wherein the one or more non-BWP specific parameters indicates a number of layers, a carrier indicator, or combination thereof.

2. The method of claim 1,
  wherein the DCI includes a plurality of fields that include a first field, a second field, and a bandwidth part indicator field; and
  wherein the method further comprises:
  determining that the DCI indicates the BWP switch request based on a value of the bandwidth part indicator field,
  wherein the first field is a non-BWP specific field and the second field is a BWP specific field.

3. The method of claim 2, wherein the DCI includes:
  an uplink (UL) DCI; or
  a downlink (DL) DCI.

4. The method of claim 3, wherein, for the UL DCI, the first field includes a carrier indicator field, a modulation and coding scheme field, a precoding information and number of layers field, an antenna ports field, or a combination thereof.

5. The method of claim 3, wherein, for the DL DCI, the first field includes a carrier indicator field, an antenna ports field, or a combination thereof.

6. The method of claim 2, further comprising:
  prior to receiving the DCI, configuring the UE for a first BWP; and
  based on a determination that the first value of the first field is invalid, maintaining the first BWP.

7. The method of claim 2, further comprising, based on a determination that a first value of the first field is valid:
  performing the BWP switch from the first BWP to the second BWP; and
  after the BWP switch to the second BWP, determining whether a second value of the second field of the DCI is valid.

8. The method of claim 7, wherein the second field includes a frequency domain resource assignment field, a time domain resource assignment field, or a combination thereof.

9. The method of claim 7, further comprising, based on a determination that the second value of the second field is invalid:
  performing another BWP switch from the second BWP to the first BWP.

10. The method of claim 7, further comprising, based on a determination that the second value of the second field is valid:
  communicating using the second BWP.

11. A user equipment (UE) comprising:
  a memory storing processor-readable code; and
  at least one processor coupled to the memory, the at least one processor configured to execute the processor-readable code to cause the at least one processor to:
  receive a radio resource control (RRC) signaling that comprises one or more non-bandwidth part (non-BWP) specific parameters;
  receive, on a first BWP, downlink control information (DCI) that indicates one or more resource assignments to the UE and a BWP switch request;
  validate a resource grant by comparing one or more fields of the DCI with the one or more non-BWP specific parameters; and
  switch to a second BWP or maintain the first BWP based on a result of the validating;

wherein the one or more non-BWP specific parameters indicates a number of layers, a carrier indicator, or combination thereof.

12. The UE of claim 11, further comprising:
a modem, the modem includes the at least one processor.

13. The UE of claim 11, wherein, when the DCI includes an uplink (UL) DCI, a first field includes a carrier indicator field, a modulation and coding scheme field, a precoding information and number of layers field, an antenna ports field, or a combination thereof.

14. The UE of claim 13, wherein, when the DCI includes a downlink (DL) DCI, the first field includes a carrier indicator field, an antenna ports field, or a combination thereof.

15. The UE of claim 13, wherein the at least one processor is configured to execute the processor-readable code to cause the at least one processor to:
prior to receiving the DCI, configure the UE for a first BWP; and
based on a determination that a first value of the first field is invalid, maintain the first BWP.

16. The UE of claim 13, wherein the at least one processor is configured to execute the processor-readable code to cause the at least one processor to, based on a determination that a first value of the first field is valid:
perform the BWP switch from a first BWP to a second BWP; and
after the BWP switch to the second BWP, determine whether a second value of a second field of the DCI is valid.

17. The UE of claim 16, wherein the second field includes a frequency domain resource assignment field, a time domain resource assignment field, or a combination thereof.

18. The UE of claim 16, wherein the at least one processor is configured to execute the processor-readable code to cause the at least one processor to, based on a determination that the second value of the second field is invalid:
perform another BWP switch from the second BWP to the first BWP.

19. The UE of claim 16, wherein the at least one processor is configured to execute the processor-readable code to cause the at least one processor to, based on a determination that the second value of the second field is valid:
communicate using the second BWP.

20. An apparatus configured for wireless communication, the apparatus comprising:
means for receiving a radio resource control (RRC) signaling that comprises one or more non-bandwidth part (non-BWP) specific parameters;
means for receiving, on a first BWP, downlink control information (DCI) that indicates one or more resource assignments to the UE and a BWP switch request;
means for validating a resource grant by comparing one or more fields of the DCI with the one or more non-BWP specific parameters; and
means for switching to a second BWP or maintaining the first BWP based on a result of the validating;
wherein the one or more non-BWP specific parameters indicates a number of layers, a carrier indicator, or combination thereof.

21. The apparatus of claim 20, wherein, when the DCI includes an uplink (UL) DCI, a first field includes a carrier indicator field, a modulation and coding scheme field, a precoding information and number of layers field, an antenna ports field, or a combination thereof.

22. The apparatus of claim 21, wherein, when the DCI includes a downlink (DL) DCI, the first field includes a carrier indicator field, an antenna ports field, or a combination thereof.

23. The apparatus of claim 21, further comprising:
means for communicating using a first BWP prior to receiving the DCI; and
means for maintaining, based on a determination that a first value of the first field is invalid, the first BWP.

24. The apparatus of claim 23, further comprising:
means for performing, based on a determination that the first value of the first field is valid, the BWP switch from a first BWP to a second BWP; and
means for determining, after the BWP switch to the second BWP, whether a second value of a second field of the DCI is valid.

25. The apparatus of claim 24, further comprising:
means for performing, based on a determination that the second value of the second field is invalid, another BWP switch from the second BWP to the first BWP, and
wherein the second field includes a frequency domain resource assignment field, a time domain resource assignment field, or a combination thereof.

26. A non-transitory computer-readable medium storing instructions that, when executed by a processor, cause the processor to perform operations comprising:
receiving a radio resource control (RRC) signaling that comprises one or more non-bandwidth part (non-BWP) specific parameters;
receiving, on a first BWP, downlink control information (DCI) that indicates one or more resource assignments to the UE and a BWP switch request;
validating a resource grant by comparing one or more fields of the DCI with the one or more non-BWP specific parameters; and
switching to a second BWP or maintaining the first BWP based on a result of the validating;
wherein the one or more non-BWP specific parameters indicates a number of layers, a carrier indicator, or combination thereof.

27. The non-transitory computer-readable medium of claim 26, wherein the operations further include:
prior to receiving the DCI, communicating using a first BWP; and
based on a determination that the first value of a first field is invalid, maintaining the first BWP;
wherein:
the DCI includes an uplink (UL) DCI, and the first field includes a carrier indicator field, a modulation and coding scheme field, a precoding information and number of layers field, an antenna ports field, or a combination thereof, or
the DCI includes a downlink (DL) DCI, and the first field includes a carrier indicator field, an antenna ports field, or a combination thereof.

28. The non-transitory computer-readable medium of claim 27, wherein the operations further include:
performing, based on a determination that the first value of the first field is valid, the BWP switch from the first BWP to the second BWP; and
determining, after the BWP switch to the second BWP, whether a second value of a second field of the DCI is valid.

29. The non-transitory computer-readable medium of claim 28, wherein the operations further include:

performing, based on a determination that the second value of the second field is invalid, another BWP switch from the second BWP to the first BWP, wherein the second field includes a frequency domain resource assignment field, a time domain resource assignment field, or a combination thereof.

30. The non-transitory computer-readable medium of claim 28, wherein the operations further include:

based on a determination that the second value of the second field is valid, communicating using the second BWP.

\* \* \* \* \*